(12) United States Patent
Lai

(10) Patent No.: US 6,266,382 B1
(45) Date of Patent: Jul. 24, 2001

(54) TECHNIQUE FOR DETECTING AND TREATING ROBBED BIT SIGNALING IN DATA COMMUNICATIONS

(75) Inventor: Yhean-Sen Lai, Warren, NJ (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/084,160

(22) Filed: May 23, 1998

(51) Int. Cl.$^7$ ..................................................... H04L 7/00
(52) U.S. Cl. ........................... 375/354; 370/523; 375/233
(58) Field of Search ................................... 370/523, 522; 375/229, 232, 233, 354

(56) References Cited

U.S. PATENT DOCUMENTS

| | | | |
|---|---|---|---|
| 4,730,312 | * 3/1988 | Johnson et al. ........................ | 370/523 |
| 5,825,823 | * 10/1998 | Goldstein et al. ..................... | 375/286 |
| 5,859,872 | * 1/1999 | Townshend ............................ | 375/242 |
| 5,875,229 | * 2/1999 | Eyuboglu et al. ....................... | 379/1 |
| 5,970,089 | * 10/1999 | Alelyunas et al. ..................... | 375/222 |
| 5,995,548 | * 11/1999 | Williams et al. ....................... | 375/242 |
| 5,995,558 | * 11/1999 | Betts et al. ............................ | 375/316 |
| 6,002,713 | * 12/1999 | Goldstein et al. ..................... | 375/222 |
| 6,034,993 | * 3/2000 | Norrell et al. ......................... | 375/232 |
| 6,081,567 | * 6/2000 | Olafsson ............................... | 375/354 |

\* cited by examiner

*Primary Examiner*—Stephen Chin
*Assistant Examiner*—Mohammad Ghayour

(57) ABSTRACT

In a communications arrangement, a first pulse code modulation (PCM) modem communicates data in the form of PCM words with a second PCM modem through a public switched telephone network (PSTN). The transmitted data may be affected by type A and/or type B robbed bit signaling occasioned by the PSTN such that the least significant bits (LSBs) of certain PCM words are "robbed" and substituted with signaling bits. Any such type A and/or type B robbed bit signaling is detected using two different training sequences during training of the second PCM modem. The would-be PCM words affected by either robbed bit signaling are identified to the first PCM modem. The latter then avoids transmitting data using the LSBs of those PCM words. In addition, through the training, a decision feed-back equalizer in the second PCM modem is properly adjusted, taking into account any robbed bit signaling affecting the transmitted training data.

36 Claims, 2 Drawing Sheets

100

US 6,266,382 B1

TECHNIQUE FOR DETECTING AND TREATING ROBBED BIT SIGNALING IN DATA COMMUNICATIONS

FIELD OF THE INVENTION

The invention relates to communications systems and methods, and more particularly to a communications system and method in which robbed bit signaling is detected and treated in data communications.

BACKGROUND OF THE INVENTION

It is well known that a public switched telephone network (PSTN) comprising T1 facilities can form a basis for a virtual digital network providing 64 kb/s channels. For example, by synchronizing a pulse code modulation (PCM) modem to an 8 kHz sampling rate provided in a central office and using 8-bit PCM words for data transmission, the modem can theoretically achieve a data rate up to 64 kb/s.

However, in practice, due to power constraints and such channel impairments as echo and intersymbol interference, the highest data rate achievable by the PCM modem is about 56 kb/s. This rate may be further reduced as the central office periodically "robs" the least significant bit (LSB) of the PCM words and substitutes it with a signaling bit. As is well known, the robbed bit signaling is necessary for indicating call statuses to effect call administration in the PSTN. While the robbed bit substitution does not cause significant distortion in voice communications, it causes significant degradation in the data communications because of the loss of transmitted bits occasioned thereby. In addition, the robbed bit substitution undermines proper training of an equalizer in the PCM modem, thereby adversely affecting channel equalization for the data communications.

The above problem caused by robbed bit signaling can be fully overcome using the technique disclosed in the co-pending, commonly assigned United States patent application of Y. Lai entitled "Technique for Effectively Treating Robbed Bit Signaling in Data Communications," Ser. No. 08/962,516, filed Oct. 31, 1997. Specifically, the disclosed technique can be used to detect two types of robbed bit signaling, namely, type A and type B robbed bit signaling, affecting data communications received by a PCM modem. The type(s) of the robbed bit signaling is identified during training of an equalizer in the modem, and the robbed bit signaling of the identified type is taken into account to properly train the equalizer. The robbed bit signaling type identification involves transmission of a four-level training signal through the PSTN to the modem. The signal thus received by the modem is processed by training circuitry therein which includes a level adapter. Based on the received signal, the level adapter utilizes a first mechanism to determine presence of any type A robbed bit signaling, followed by a second, different mechanism to determine presence of any type B robbed bit signaling.

SUMMARY OF THE INVENTION

In accordance with the invention, the usefulness of the above-described technique for detecting and treating the robbed bit signaling is enhanced by implementing in the level adaptor only one mechanism, as opposed to two different mechanisms as used in that technique, to determine the presence of any type A and/or type B robbed bit signaling, thereby improving the efficiency of the level adaptor. Specifically, during the training of the equalizer in a PCM modem, in accordance with the invention, first and second training signals are transmitted to the PCM modem in first and second predetermined intervals, respectively. Such first and second training signals are subject to corruption by the type A and/or type B robbed bit signaling, and each are, for example, a two-level signal. However, the training signals differ from each other in their actual signal levels. Using the same mechanism in the level adapter, the type A robbed bit signaling is identified based on a first effect thereof on the first training signal while the type B robbed bit signaling is identified based on a second effect thereof on the second training signal.

DETAILED DESCRIPTION

Figure 1:
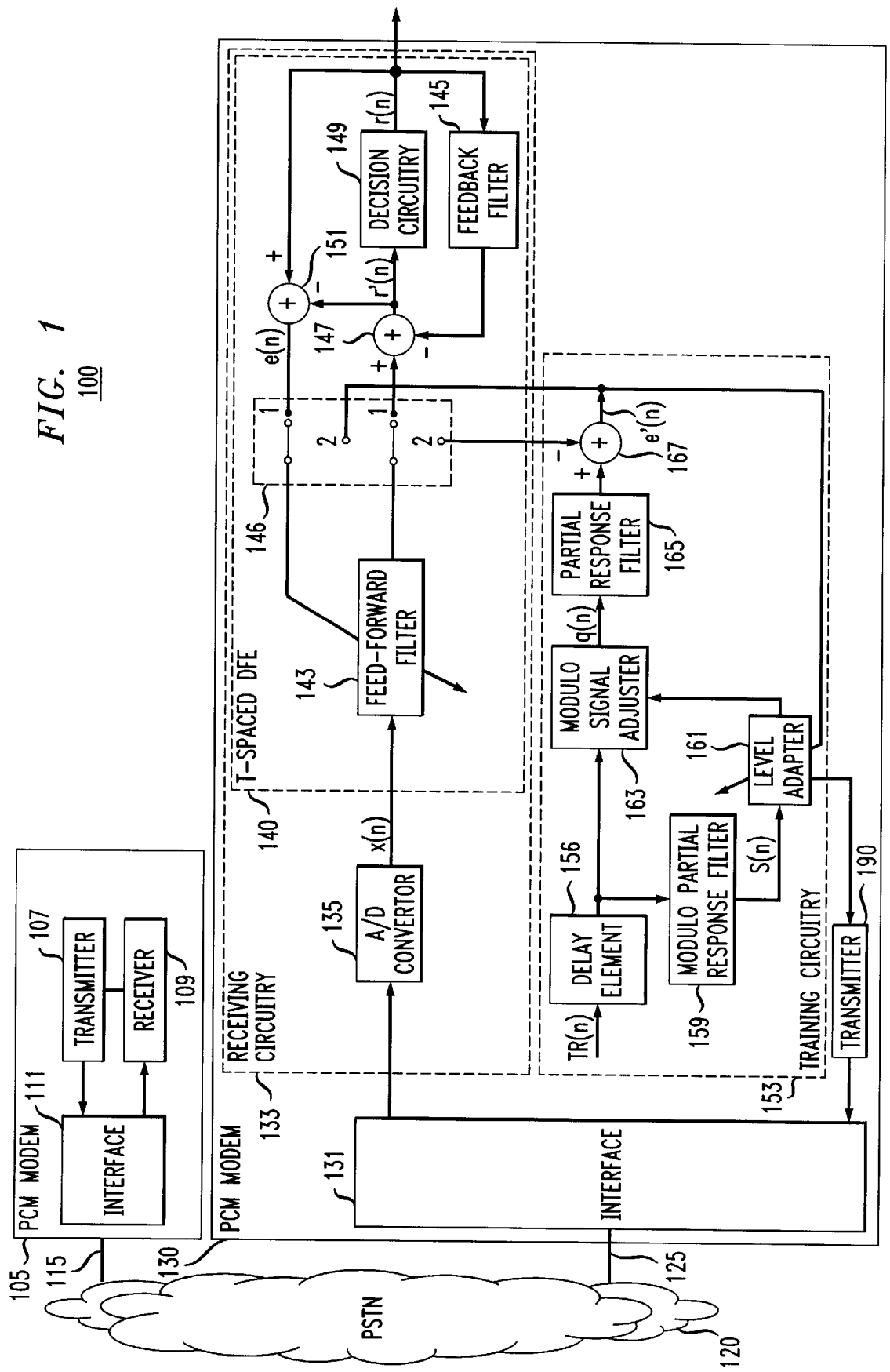
FIG. 1 illustrates communications arrangement in accordance with the invention.

FIG. 1 illustrates communications arrangement 100 embodying the principles of the invention. In arrangement 100, pulse code modulation (PCM) modem 105 at a central site is connected to public switched telephone network (PSTN) 120 via T1 line 115. Modem 105 may be employed by, say, an Internet service provider, to communicate data from the Internet to PCM modem 130 at a client site. Modem 130 may initiate a dial-up connection to modem 105 to access the Internet service. This dial-up connection includes analog loop 125 connecting modem 130 to PSTN 120.

In this instance, both modems are synchronized to an 8 kHz sampling rate provided by a conventional $\mu$-law codec in a central office (not shown) in PSTN 120. The data communications between modems 105 and 130 are in the form of 8-bit PCM words, using the non-uniformly spaced quantization levels in accordance with the standard $\mu$-law companding as the signal alphabets or data symbols. Theoretically, the highest realizable rate of such data communications is 64 kb/s. However, in practice, due to power constraints and such channel impairments as echo and intersymbol interference, the highest data rate achievable here is about 56 kb/s.

In PCM modem 105, transmitter 107 illustratively transmits Internet data through standard interface 111 to PCM modem 130 via an established dial-up connection. The spectrum of a transmitted signal, x(t) at time t, representing the Internet data spans from DC to 4 kHz over analog loop 125. The transmitted signal, however, is corrupted by the channel impairments including intersymbol interference. The transmitted signal is received by standard interface 131. The received signal is then applied to A/D convertor 135 of conventional design in receiving circuitry 133. The resulting digital samples, denoted x(n), are illustratively processed by adaptive T-spaced decision feedback equalizer (DFE) 140 of conventional design, where n=t/T and T represents the symbol interval. However, it will be appreciated that a person skilled in the art will employ, instead of DFE 140 here, an adaptive fractionally-spaced (e.g., T/2-spaced)

DFE. In a well known manner, DFE 140 decides what PCM words were transmitted based on the digital samples, and uses past decisions to compensate for the undesirable intersymbol interference.

Specifically, DFE 140 includes feed-forward filter 143 and feedback filter 145, which may be finite impulse response (FIR) filters. Let N and K be the numbers of tap coefficients of filters 143 and 145, respectively, and $c_u$'s and $p_v$'s represent the coefficients of the respective filters, where $0 \leq u < N$ and $0 \leq v < K$. The coefficients $p_v$'s are pre-selected to achieve an impulse response of an equivalent channel based on the real channel conditions.

It should be noted at this point that modem 130 operates in two modes, namely, a training mode and an operation mode. When modem 130 is initialized, the training mode, described below, is selected using switch 146. Otherwise, in the operation mode, which is the current mode, switch 146 is set at a first position to pass the output of feed-forward filter 143 to subtracter 147. This subtracter subtracts, from the received output, the output of feedback filter 145. The resulting difference, denoted r'(n), is provided to decision circuitry 149. The latter determines what the most likely transmitted PCM words are, which are denoted r(n). The decisions from circuitry 149 are provided as an input to feedback filter 145, and are also provided as an input to subtracter 151. Using r'(n) as another input, subtracter 151 evaluates an error signal e(n) as follows:

$$e(n)=r(n)-r'(n)=r(n)-[P^T(n)R(n)-C^T(n)\times(n)],$$

where P(n), R(n), C(n) and X(n) are vectors, the subscript "T" denotes a standard vector transposition operation, $$P^T(n)=[p_{K-1}(n)p_{K-2}(n) \ldots p_1(n)p_0(n)], \text{ with } p_0(n)=1,$$

$$R^T(n)=[r(n-(K-1))r(n-(K-2)) \ldots r(n-1)r(n)],$$

$$C^T(n)=[c_{N-1}(n)C_{N-2}(n) \ldots c_1(n)c_0(n)], \text{ and}$$

$$X^T(n)=[x(n-(N-1))x(n-(N-2)) \ldots x(n-1)x(n)].$$

In the current operation mode, the error signal e(n) is passed, through switch 146, onto feed-forward filter 143 to update its tap coefficients according to the following expression:

$$C(n+1)=C(n)+2\alpha e(n)\times(n),$$

where α represents a predetermined step-size of the update.

Figure 2:
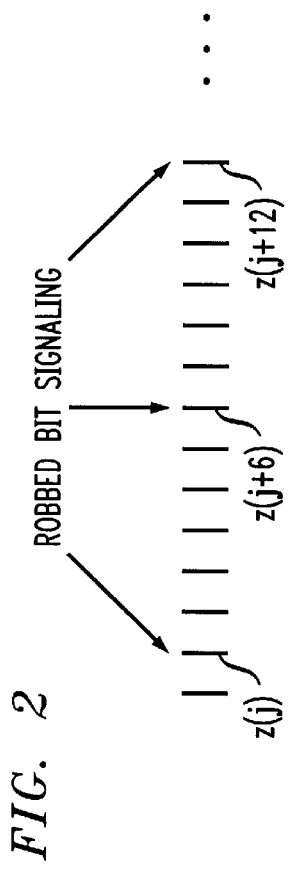
FIG. 2 illustrates periodicity of robbed bit signaling affecting data symbols transmitted by a PCM modem in the arrangement of FIG. 1.

Like a conventional PSTN, PSTN 120 implements robbed bit signaling to indicate call statuses to effect call administration therein. In robbed bit signaling, the central office in PSTN 120 robs the LSB of a transmitted symbol on each T1 channel once in every six frames. Thus, referring to FIG. 2, if the robbed bit signaling affects an $j^{th}$ PCM word (denoted z(j)) transmitted by modem 105 on a channel of T1 line 115, it equally affects every $(j+6k)^{th}$ PCM word transmitted thereby, where k is an integer. As each affected PCM word has its LSB substituted by a signaling bit, the loss of the LSB data causes significant degradation to the data transmission. In addition, the robbed bit substitution undermines proper training of DFE 140, thereby adversely affecting the channel equalization in data recovery.

Two types of robbed bit signaling have been identified. A first one herein is referred to as "Type A" robbed bit signaling, and the other herein is referred to as "Type B" robbed bit signaling. In the type A robbed bit signaling, the LSB of the transmitted PCM word is always set to a binary value "1". For example, when modem 105 is used to communicate data represented by a PCM word "4F" (in hexadecimal) to modem 130, transmitter 107 transmits onto line 115 its µ-law value, "B0," which is the complement of "4F" in accordance with the µ-law companding technique. Implementing the type A robbed bit signaling, an intermediate central office in PSTN 120 transforms the transmitted word "B0" to "B1." The transformed word would be converted by a µ-law codec in a central office close to modem 130 to an analog signal with a signal level of 3772 units in this instance. Assuming no channel imperfection, A/D converter 135 in modem 130 would convert the analog signal to a digital representation of "4E," which is the complement of "B1." Thus, because of the type A robbed bit signaling, the PCM word "4F" communicated by modem 105 becomes "4E" when received at modem 130. However, it should be noted that the type A robbed bit signaling has no effect on communicated words whose LSB's="0", e.g., "4E."

On the other hand, when a transmitted PCM word affected by the type B robbed bit signaling is converted to an analog signal on analog loop 125, the signal level takes on an average value between that representing the PCM word having the LSB="1" and that representing the PCM word having the LSB="0." For example, when the PCM word "4E" corresponding to an analog signal level of 3772 units is communicated by modem 105, the level of the analog signal received by A/D converter 135 in modem 130 is indiscriminately 3836 units approximately, which is the average of 3772 units corresponding to "4E" and 3900 units corresponding to "4F". Thus, when the communicated word is "4E," assuming no channel imperfection, A/D converter 135 would covert it to "4E" about half the times and "4F" the other half.

In accordance with the invention, during the training of modem 130, whether any type A and/or type B robbed bit signaling affecting the data transmission from modem 105 to modem 130 is identified. Depending on the type(s) of the identified robbed bit signaling, feed-forward filter 143 in DFE 140 is accordingly adjusted to provide proper channel equalization. In addition, the identities of would-be PCM words affected by either type of robbed bit signaling are communicated to modem 105. The latter then avoids transmitting data in the LSBs of those PCM words.

In this illustrative embodiment, the reference signals used to train modem 130 include two sequences of non-spectrum shaping signals, hereinafter referred to as a "TRNA" sequence and "TRNB" sequence, respectively. Specifically, the signals in the TRNA sequence each have an amplitude $a_0$=3900 units corresponding to "4F," and may differ from one another in their signs. Similarly, the signals in the TRNB sequence each have an amplitude $a_0'$=3772 units corresponding to "4E," and may differ from one another in their signs. The provision of each of the TRNA and TRNB sequences involves generation of a pseudo random bit stream. The signs of the signals in each sequence are determined in response to the values of the pseudo random bits generated. For example, a pseudo random bit having a value "1" indicates "+," and causes the signal corresponding thereto to carry a "+" sign. On the other hand, a pseudo random bit having a value "0" indicates "−," and causes the signal corresponding thereto to carry a "−" sign. Thus, in this instance, the TRNA sequence consists of signals having two levels, i.e., $\pm a_0$, while the TRNB sequence consists of signals having two different levels, i.e., $\div a_0'$.

Figure 3:
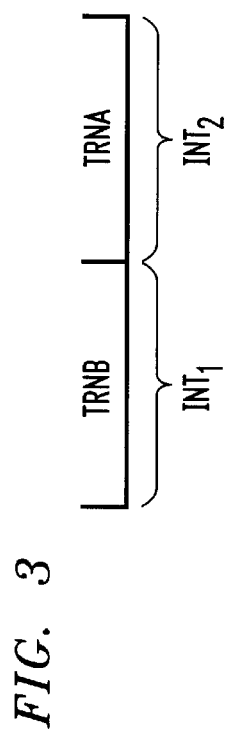
FIG. 3 illustrates an arrangement of two different training sequences used to identify type A and type B robbed bit signaling, respectively, in accordance with the invention.

As fully described below, the TRNA sequence is used here to detect presence of any type A robbed bit signaling occasioned by PSTN 120 and the TRNB sequence to detect presence of any type B robbed bit signaling. FIG. 3 illustrates the order in which the sequences are applied during the training. As shown in FIG. 3, TRNB sequence is applied during a first interval $INT_1$, e.g., 0.5 second long, followed by TRNA sequence during a second interval $INT_2$, e.g., 0.5 second long.

Figure 4:
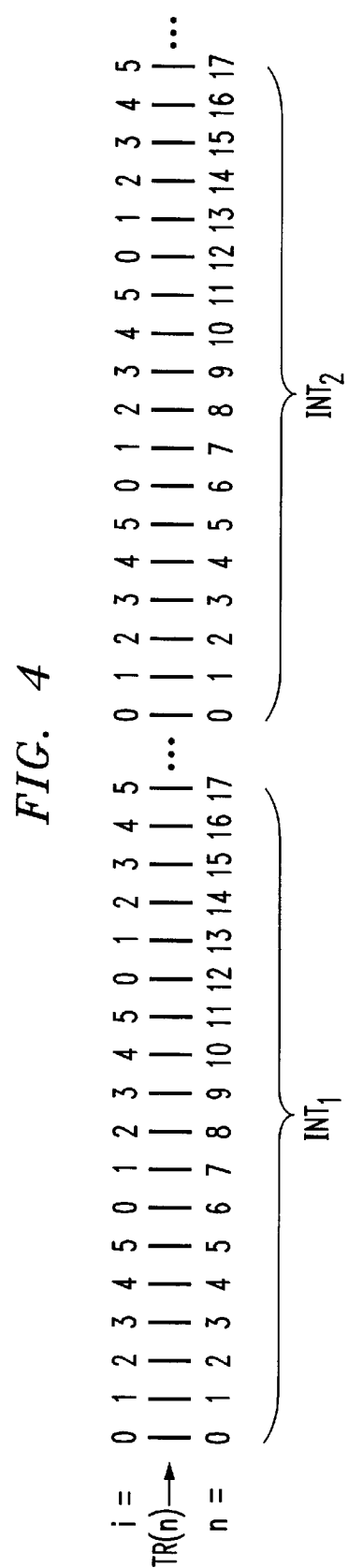
FIG. 4 illustrates grouping of symbols according to the periodicity of the robbed bit signaling.

In the training mode, modem 130 has switch 146 set at a second position. Modem 105 transmits data based on the signals in the TRNB and TRNA sequences, denoted TR(n), to train feed-forward filter 143 in the respective intervals $INT_1$ and $INT_2$. It should be noted that if robbed bit signaling of type B (or type A) affects a first signal in the TRNB (or TRNA) sequence during $INT_1$ (or $INT_2$), every $6^{th}$ signal from that first signal in the sequence would be equally affected during the same interval. Referring to FIG. 4, to effectively identify any affected signals, the signals in the TRNA and TRNB sequences in their respective intervals are divided into six groups, i.e., groups i=0, 1, . . . 5. In this instance, group 0={TR(0) TR(6) TR(12) . . . group 1={TR (1) TR(7) TR(13) . . .}, group 2={TR(2) TR(8) TR(14) . . . }, group 3=(TR(3) TR(9) TR(15) . . . }, group 4={TR(4) TR(10) TR(16) . . . }, and group 5={TR(5) TR(11) TR(17) . . . }. If any member of one such group is affected by type A or type B robbed bit signaling, all members in that group are equally affected.

Referring back to FIG. 1, a local training sequence TR(n) is fed to delay element 156 in training circuitry 153. Element 156 imposes a delay of (K−1)T to the input sequence to synchronize the operations of various elements in circuitry 153. Modulo partial response filter 159 performs the grouping described above and processes the training sequence in groups according to the following expression:

$$s_i(n) = \sum_{m=0}^{\frac{N-mod\ 6[N]}{6}} p_{mod\ 6[n-i]+6m} TR(n - mod\ 6[n-i] - 6m),$$

where i=0, 1, . . . , 5; mod 6 [*] denotes a standard modulo 6 operation on the argument "*". The output of filter 159, denoted vector S(n), is provided to level adapter 161, where $S^T(n) = [s_0(n)\ s_1(n)\ s_2(n)\ s_3(n)\ s_4(n)\ s_5(n)]$. Based on S(n) and another input e'(n) to be described, level adapter 161 provides weighting factors, denoted $h_i(n)$, to modulo signal adjuster 163, where i=0, 1, 2 . . . , 5. The manner in which $h_i(n)$'s are derived is fully described below. Using the received weighting factors and a delayed version of TR(n), modulo signal adjuster 163 computes an output q(n) according to the following expression:

$$q(n) = \text{sign}[TR(n)](a_0' + h_{mod\ 6[n]}\delta), \quad [1]$$

where $a_0'$=3772 units described before, $\delta = a_0 - a_0' = 128$ units, and $$\text{sign}[\tau] = \begin{cases} +1 & \tau > 0.0 \\ 0 & \tau = 0.0 \\ -1 & \tau < 0.0 \end{cases}$$

The output q(n) is fed to partial response filter 165 having the same tap coefficients as feedback filter 145. Filter 165 forms an output o(n) expressed as follows:

$$o(n) = P^T(n)Q(n),$$

where $Q^T(n) = [q(n-(K-1)\ q(n-(K-2)) \ldots q(n-1)\ q(n)]$.

The output o(n) is provided to subtracter 167. The latter also receives a signal from feed-forward filter 143 through switch 146. This signal is derived by filter 143 from the data transmission by modem 105 based on the training sequence TR(n). Subtracter 167 subtracts the level of the signal by filter 143 from o(n) to form the aforementioned error signal e'(n). This error signal is applied through switch 146 to feed-forward filter 143 to adapt its filter coefficients in a conventional manner. As mentioned before, e'(n) is also applied to level adapter 161. Based on e'(n), and S(n) from modulo partial response filter 159, level adapter 161 updates the aforementioned weighting factors $h_i(n)$, i=0, 1, . . . 5, as follows:

$$H(n+1) = H(n) - 2\beta e'(n)S(n), \quad [2]$$

where $H(n) = [h_0(n)\ h_1(n)\ h_2(n)\ h_3(n)\ h_4(n)\ h_5(n)]$, and $\beta$ is the step-size of the update.

In order to stabilize feed-forward filter 143 in the beginning of the training, the weighting factors are not updated by level adapter 161 and are each set to be 0.0. After filter 143 is stabilized to a certain extent, level adapter 161 starts to update the weighting factors according to expression [2].

It can be shown that if a particular transmitted training data group i=I, $0 \leq I \leq 5$, is affected by the type B robbed bit signaling during $INT_1$, the corresponding $h_I(n)$ from expression [2] would be close to 0.5. For other groups which are affected by the type A or no robbed bit signaling, the corresponding $h_i(n)$, i≠I, would be close to zero. Thus, the above exercise effectively detects any transmitted data groups affected by the type B robbed bit signaling only. After group I is identified, the identity thereof (i.e., I) is communicated back to modem 105 using transmitter 190. The information concerning the group identity is received by receiver 109, which conveys the received information to transmitter 107. In operation, transmitter 107 avoids transmission of data using the LSB of each PCM word generated during the $n^{th}$ symbol interval, with mod 6 [n]=I corresponding to group I.

In addition, it can be shown that if a particular transmitted training data group i=I', $0 \leq I' \leq 5$, is affected by the type A robbed bit signaling during $INT_2$, the corresponding $h_{I'}(n)$ from expression (2) would be close to −1.0. For other groups which are affected by type B robbed bit signaling or no robbed bit signaling, the corresponding $h_i(n)$, i≠I', would be close to −0.5 or zero. Similarly, after group I' is identified, the identity thereof (i.e., I') is communicated back to modem 105 using transmitter 190. In operation, transmitter 107 avoids transmission of data using the LSB of each PCM word generated during the n symbol interval, with mod 6 [n]=I' corresponding to group I'. It should be noted that group I' here is not limited to only one group but generically represents one or more groups affected by the type A robbed bit signaling.

Adjuster 163 modifies the local training sequences, taking into account any detected type A and/or type B robbed bit signaling. The modified sequences which conform to the received training sequences from PSTN 120 is used to properly train feed-forward filter 143 and thus DFE 140. For example, where the type A robbed bit signaling is detected in the $n^{th}$ symbol interval (i.e., mod 6 [n]=I') during $INT_2$, q(n) is set to $a_0'$ corresponding to "4E", with the proper sign. This stems from the earlier observation that the transmission of "4F" in the TRNA sequence after it is received in modem 103 becomes "4E" due to the type A robbed bit signaling.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, communications arrangement 100 disclosed herein uses T1 facilities which are common in the United States. However, the invention is equally applicable in other countries such as European countries where E1 facilities instead of the T1 facilities are used, and where A-law companding instead of µ-law companding controls.

Finally, communications arrangement 100 disclosed herein is in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

I claim:

1. Apparatus for receiving signals from a source, the signals being subject to corruption by robbed bit signaling, the apparatus having an adaptive component, comprising:

a mechanism for identifying at least a first type and a second type of the robbed bit signaling, the robbed bit signaling of the first type being identified based on a first effect thereof on first predetermined signals provided from the source in a first predetermined interval, and the robbed bit signaling of the second type being identified based on a second effect thereof on second predetermined signals provided from the source in a second predetermined interval, each of the first predetermined signals being different from each of the second predetermined signals; and a controller for adjusting the adaptive component based on any robbed bit signaling of the first type and any robbed bit signaling of the second type identified; wherein said adaptive component comprising a decision feedback equalizer (DFE) responsive to a plurality of weighting factors and producing DFE coefficients, said weighting factors being adapted according to the equation $H(n+1)=H(n)-2\beta e'(n)S(n)$; wherein $H(n)$ comprises a plurality of weighing factors, $S(n)$ comprises a modulo partial response parameter, $e'(n)$ comprises an error signal, and $\beta$ comprises an update step size.

2. The apparatus of claim 1 wherein an amplitude of each of the first predetermined signals is different from that of each of the second predetermined signals.

3. The apparatus of claim 1 wherein each of the first predetermined signals has a selected one of two predetermined signal levels.

4. The apparatus of claim 3 wherein the two levels have an identical amplitude but opposite signs.

5. The apparatus of claim 1 wherein the adaptive component includes an equalizer.

6. The apparatus of claim 1 wherein the first and second predetermined intervals form part of a training period.

7. The apparatus of claim 1 wherein the controller includes the mechanism.

8. The apparatus of claim 1 further comprising a processor for grouping at least the first predetermined signals according to periodicity of the robbed bit signaling.

9. The apparatus of claim 1 wherein the first predetermined signals are unaffected by the robbed bit signaling of the second type.

10. The apparatus of claim 1 comprising a pulse code modulation (PCM) modem.

11. A communications system having an adaptive component, comprising:

an interface for receiving symbols representative of selected information, the symbols being provided from a source, which include first predetermined symbols and second predetermined symbols, the first and second predetermined symbols being provided in a first predetermined interval and a second predetermined interval, respectively, each of the first predetermined symbols being different from each of the second predetermined symbols;

a processor for identifying at least one set of received symbols which is affected by robbed bit signaling, the processor including a mechanism for detecting at least a first type and a second type of the robbed bit signaling, the robbed bit signaling of the first type being detected based on a first effect thereof on the first predetermined symbols, and the robbed bit signaling of the second type being detected based on a second effect thereof on the second predetermined symbols;

a controller for adjusting the adaptive component based on any robbed bit signaling of the first type and any robbed bit signaling of the second type detected; and an output for providing data concerning an identify of the at least one set to avoid a loss of information in transmission of other symbols associated with the at least one set; wherein said adaptive component comprising a decision feedback equalizer (DFE) responsive to a plurality of weighting factors and producing DFE coefficients, said weighting factors being adapted according to the equation $H(n+1)=H(n)-2\beta e'(n)S(n)$; wherein $H(n)$ comprises a plurality of weighing factors, $S(n)$ comprises a modulo partial response parameter, $e'(n)$ comprises an error signal, and $\beta$ comprises an update step size.

12. The system of claim 11 comprising a PCM modem.

13. The system of claim 11 wherein each symbol includes a PCM word.

14. The system of claim 11 wherein the adaptive component includes an equalizer.

15. The system of claim 11 includes a public switched telephone network (PSTN) generating the robbed bit signaling.

16. A method for use in an apparatus for receiving signals subject to corruption by robbed bit signaling, the apparatus having an adaptive component, said method comprising:

identifying at least a first type and a second type of the robbed bit signaling, the robbed bit signaling of the first type being identified based on a first effect thereof on first predetermined signals provided from the source in a first predetermined interval, and the robbed bit signaling of the second type being identified based on a second effect thereof on second predetermined signals provided from the source in a second predetermined interval, each of the first predetermined signals being different from each of the second predetermined signals; and adjusting the adaptive component based on any robbed bit signaling of the first type and any robbed bit signaling of the second type identified; wherein said adaptive component comprising a decision feedback equalizer (DFE) responsive to a plurality of weighting factors and producing DFE coefficients, said weighting factors being adapted according to the equation $H(n+1)=H(n)-2\beta e'(n)S(n)$; wherein $H(n)$ comprises a plurality of weighing factors, $S(n)$ comprises a modulo partial response parameter, $e'(n)$ comprises an error signal, and $\beta$ comprises an update step size.

17. The method of claim 16 wherein an amplitude of each of the first predetermined signals is different from that of each of the second predetermined signals.

18. The method of claim 16 wherein each of the first predetermined signals has a selected one of two predetermined signal levels.

19. The method of claim 18 wherein the two levels have an identical amplitude but opposite signs.

20. The method of claim 16 wherein the first and second predetermined intervals form part of a training period.

21. The method of claim 16 further comprising grouping at least the first predetermined signals according to periodicity of the robbed bit signaling.

22. The method of claim 16 wherein the first predetermined signals are unaffected by the robbed bit signaling of the second type.

23. A method for use in a communications system having an adaptive component, comprising:

receiving symbols representative of selected information which include first predetermined symbols and second predetermined symbols, the first and second predetermined symbols being provided in a first predetermined interval and a second predetermined interval, respectively, each of the first predetermined symbols being different from each of the second predetermined symbols;

identifying at least one set of received symbols which is affected by robbed bit of at least a first type and a second type, the robbed bit signaling of the first type being detected based on a first effect thereof on the first predetermined symbols, and the robbed bit signaling of the second type being detected based on a second effect on the second predetermined symbols;

adjusting the adaptive component based on any robbed bit signaling of the first type and any robbed bit signaling of the second type detected; and providing data concerning an identity of the at least one set to avoid a loss of information in transmission of other symbols associated with the at least one set; wherein said adaptive component comprises a decision feedback equalizer (DFE) responsive to a plurality of weighting factors and producing DFE coefficients, said step of adapting comprising the step of adapting said weighting factors according to the equation $H(n+1)=H(n)-2\beta e'(n)S(n)$; wherein $H(n)$ comprises a plurality of weighing factors, $S(n)$ comprises a modulo partial response parameter, $e'(n)$ comprises an error signal, and $\beta$ comprises an update step size.

24. The method of claim 23 wherein each symbol includes a PCM word.

25. The method of claim 23 wherein each of the first predetermined signals has a selected one of two predetermined signal levels.

26. The method of claim 25 wherein the two levels have an identical amplitude but opposite signs.

27. The method of claim 23 wherein the first and second predetermined intervals form part of a training period.

28. The method of claim 23 wherein the first predetermined signals are unaffected by the robbed bit signaling of the second type.

29. The apparatus of claim 1, wherein said first and second predetermined signals and said DFE coefficients comprise modulo n coefficients, where n is an integer.

30. The apparatus of claim 29, wherein n=6.

31. The apparatus of claim 1, wherein said first and second predetermined signals comprise training sequences that are processed in groups according to the following equation:

$$s_i(k) = \sum_{m=0}^{\frac{N-mod\ 6[N]}{6}} p_{mod\ 6[k-i]+6m} TR(k - mod\ 6[k-i] - 6m).$$

32. The apparatus of claim 1 wherein one error signal is generated to simultaneously update each of n slots with different weight factors.

33. The method of claim 16, wherein said first and second predetermined signals and said DFE coefficients comprise modulo n coefficients, where n is an integer.

34. The apparatus of claim 33, wherein n=6.

35. The method of claim 16, wherein said first and second predetermined signals comprise training sequences that are processed in groups according to the following equation:

$$s_i(k) = \sum_{m=0}^{\frac{N-mod\ 6[N]}{6}} p_{mod\ 6[k-i]+6m} TR(k - mod\ 6[k-i] - 6m).$$

36. The method of claim 16 wherein one error signal is generated to simultaneously update each of n slots with different weight factors.

* * * * *